(12) United States Patent
Harris et al.

(10) Patent No.: US 8,121,655 B2
(45) Date of Patent: Feb. 21, 2012

(54) METHOD AND DEVICE FOR IMPROVING BATTERY LIFE OF A MOBILE STATION

(75) Inventors: John M Harris, Glenview, IL (US); Van E. Kelly, Bernardsville, NJ (US)

(73) Assignee: Motorola Mobility, Inc., Libertyville, IL (US)

( * ) Notice: Subject to any disclaimer, the term of this patent is extended or adjusted under 35 U.S.C. 154(b) by 1025 days.

(21) Appl. No.: 11/954,377

(22) Filed: Dec. 12, 2007

(65) Prior Publication Data

US 2009/0156269 A1     Jun. 18, 2009

(51) Int. Cl.
*H04M 1/00* (2006.01)

(52) U.S. Cl. .............. 455/574; 455/127.1; 455/127.5; 455/343.2; 455/343.5; 455/515; 455/567; 455/569.1

(58) Field of Classification Search .......... 455/574, 455/127.1, 127.5, 343.2, 343.5, 515
See application file for complete search history.

(56) References Cited

U.S. PATENT DOCUMENTS

| | | | |
|---|---|---|---|
| 5,619,568 A * | 4/1997 | Miller | 455/566 |
| 6,560,453 B1 * | 5/2003 | Henry et al. | 455/67.11 |
| 2006/0116175 A1 * | 6/2006 | Chu | 455/567 |
| 2007/0021132 A1 * | 1/2007 | Jin et al. | 455/518 |
| 2007/0099635 A1 * | 5/2007 | Mohanty et al. | 455/458 |
| 2007/0238476 A1 * | 10/2007 | Sharma et al. | 455/515 |
| 2008/0293437 A1 * | 11/2008 | Ranganathan et al. | 455/458 |

\* cited by examiner

*Primary Examiner* — Patrick Edouard
*Assistant Examiner* — Shantell L Heiber
(74) *Attorney, Agent, or Firm* — Gary J. Cunningham

(57) ABSTRACT

A method (150) and device (200) for conserving energy in a power storage device of a mobile station (102, 110), including: selecting (155) an alert mode associated with a mobile station, the alert mode including at least one of: silent alert, vibrate and manual answer; detecting (160) the alert mode of the mobile station; and increasing (165) a length of a paging cycle in order to conserve power of an energy storage device associated with the mobile station (102, 110), in response to the detected alert mode. The method provides a useful compromise for energy conservation of a power storage device on one hand, while also accommodating a user's demand for a short paging interval when desired, on the other.

16 Claims, 3 Drawing Sheets

*150*

*155*
SELECTING AN ALERT MODE ASSOCIATED WITH A MOBILE STATION, THE ALERT MODE INCLUDING AT LEAST ONE OF : SILENT ALERT, VIBRATE AND MANUAL ANSWER

*160*
DETECTING THE ALERT MODE OF THE MOBILE STATION

*165*
INCREASING A LENGTH OF A PAGING CYCLE IN ORDER TO CONSERVE POWER OF AN ENERGY STORAGE DEVICE ASSOCIATED WITH THE MOBILE STATION, IN RESPONSE TO THE DETECTED ALERT MODE

METHOD AND DEVICE FOR IMPROVING BATTERY LIFE OF A MOBILE STATION

FIELD OF THE INVENTION

The field of the invention relates to mobile stations in networks and the energy storage device conditions at these mobile stations.

BACKGROUND OF THE INVENTION

To operate, wireless computing devices, such as mobile station, operate with a power storage device with a limited energy supply, such as a battery, fuel cell or the like. A mobile station needs a power source and, in many cases, this power source is a battery. For instance, cellular phones use various types of batteries to operate. The amount of time a mobile station can typically operate before the power of the battery is consumed (which is often referred to as "battery life"), is often an important criteria that consumers use in choosing one brand or type of mobile station over another brand or type of mobile station. The terms battery, energy storage device and power storage device are used interchangeably herein.

Additionally, different operating environments can cause the user to be surprised and/or frustrated when the battery runs out much more quickly than would typically be expected by the user. Thus, a variation or unexpected short battery life is also undesirable from the user perspective.

While the power storage device is generally rechargeable, it may not always be convenient or even possible for a user to recharge. Accordingly, there is a need to maximize the useful operational time of a wireless computing device.

Thus, there is a need for increasing a length of a paging cycle, in order to conserve energy in a power storage device of a wireless computing device, such as a mobile station, in order to prolong useful power storage device (battery) life.

Thus, there is a need for a method and device for prolonging the useful life of a power storage device in wireless communication devices.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

A system and method is described that adjusts the paging cycle length associated with a mobile station (or wireless communication device, such terms used interchangeably herein) in order to conserve and improve the life of an energy storage device in connection with a mobile station. The approaches described herein allow a mobile station to operate in a variety of conditions and provide a variety of bandwidth intensive services without substantially compromising the energy storage device in association with the mobile station.

Adjustments to the paging cycle may be made in a variety of different ways. In one example, the length of the paging cycle may be increased. In another example, the size of a slot cycle index of the paging cycle may be changed.

Further adjustments may also be made to the paging cycle. For instance, if the paging cycle has been lengthened, the length may be returned to its original length or to an optimal value, after the expiration of a period of time.

Thus, approaches are described whereby the power storage device of the mobile station is improved even under less than ideal operating conditions and different modes of operation. Consequently, the mobile station can operate under a variety of operating conditions.

Figure 1:
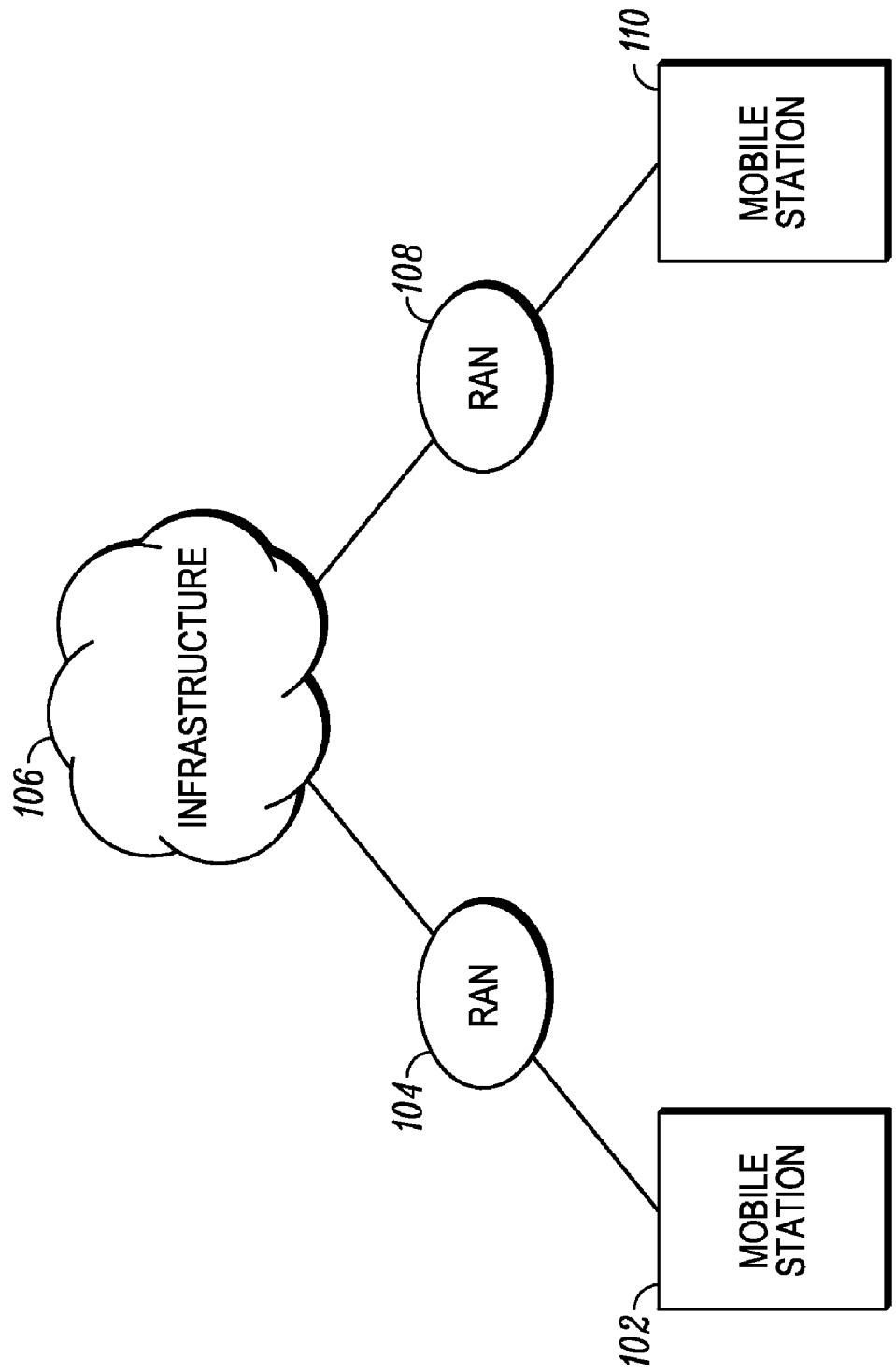
FIG. 1 is a block diagram of a system for improving the battery life of a mobile station according to the present invention.

Referring now to FIG. 1, one example of a system for increasing the battery life of a mobile station is described. The system includes a first mobile station 102 that is coupled to a first Radio Access Network (RAN) 104. The first RAN 104 is coupled to a communication infrastructure 106. A second mobile station 110 is coupled to a second RAN 108. The second RAN 108 is also coupled to the infrastructure 106. The principles described herein may be applied to a variety of systems such as long-term evolution (LTE), ultra mobile wideband (UMB), 802.16e & m, High Rate Packet Data (HRPD) systems, or systems such as the Universal Mobile Telecommunication System (UMTS).

The mobile stations 102 and 110 may be any type of mobile wireless device. For example, the mobile stations 102 and 110 may be cellular telephones, pagers, personal computers, or personal digital assistants. As should be understood by those skilled in the art, other examples of mobile stations and wireless communication devices are possible.

The RANs 104 and 108 may be any device or combination of devices that allow the mobile stations 102 and 110 to have access to the communication infrastructure 106. For example, the RANs 104 and 108 may include base stations, base station controllers, antennas, and other types of devices that facilitate these communications.

The communication infrastructure 106 preferably includes devices and/or networks that allow communications to be made between mobile stations. For example, the infrastructure 106 may include switches, servers, storage devices, and networks (e.g., wireless networks, the Internet, landline telephone networks) that facilitate communications between the mobile stations 102 and 110.

In one example of the operation of the system of FIG. 1, at least one Radio Frequency (RF) operating condition associated with a mobile station 102 or 110 is obtained. The RF operating condition is compared to a value the preferably comprises an optimum value. As mentioned above and as used herein, "optimum value" refers to a value selected by a system administrator, user, or other party wherein the value is selected in order to achieve or facilitate system operation. For instance, if the Radio Frequency (RF) conditions time averaged or expected over the next time interval are poor (e.g., based upon recent reports or a long pattern of data points) the value may not be optimal. In another example, a measured condition may less than optimal when less than a threshold.

When the RF operating condition is substantially different from the optimum value, the paging cycle is adjusted in order to conserve power in a battery associated with the mobile station 102 or 110. In one example, the length of the paging cycle may be increased. After the paging cycle has been lengthened, the length may be returned to its original length or an optimal value after the expiration of a period of time. In another example, the system may increase paging channel, Quick Paging Channel (QPCH), or Pilot Channel (PICH) indicator redundancy as well as slot length.

In another example, the size of a slot cycle index of the paging cycle may be changed. Thereafter, the size of the slot cycle index may be returned to an optimal value. For instance, the size may be returned to the original size and an optimal size after expiration of a period of time.

In another approach, the paging cycle may be adjusted based upon a characteristic of the mobile station. For instance, the characteristic may be that the mobile station is currently operating a streaming service, a lower mobility of the mobile station, the mobile station is not plugged into a wired battery life source, or the remaining battery life is less than a threshold. Other examples are possible.

Figure 2:
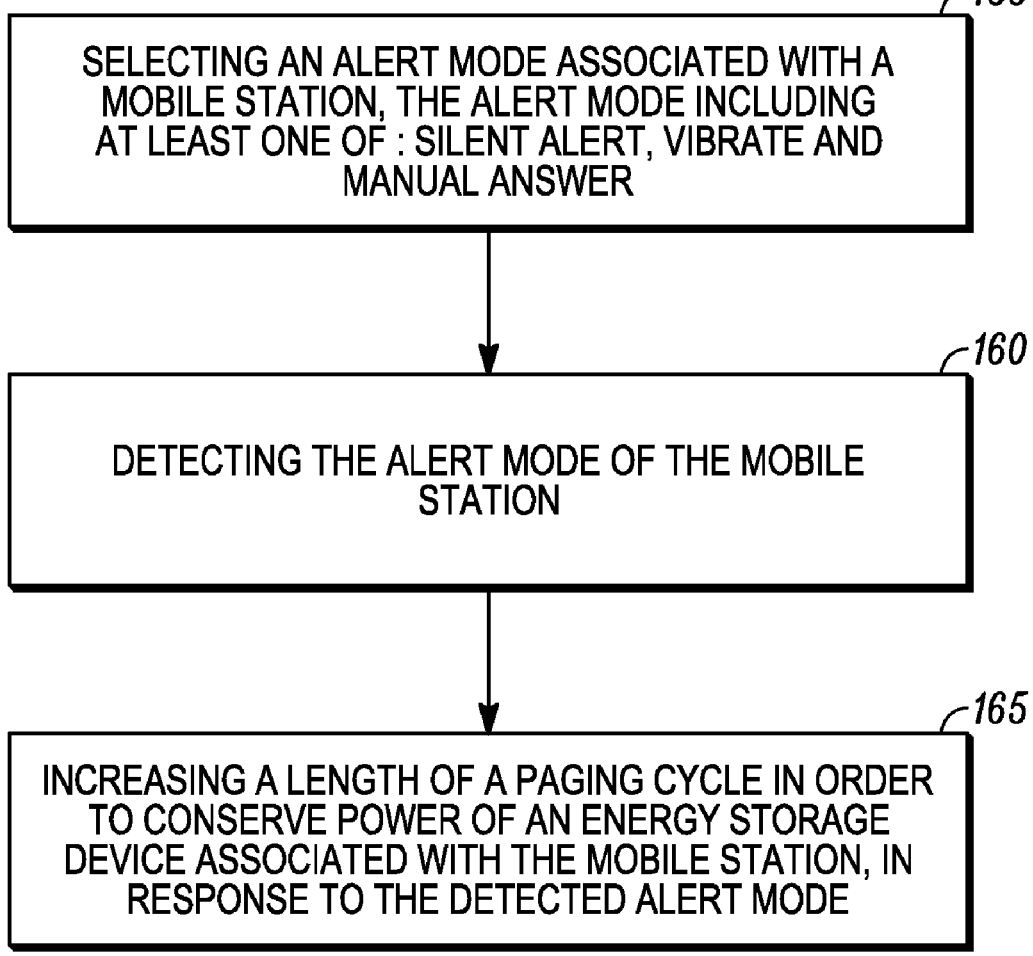
FIG. 2 is a flowchart of one example of an approach for improving the battery life of a mobile station according to the present invention.

Referring now to FIG. 2, one example of an approach for lengthening the energy storage device of a mobile station is described. In it's simplest form, the method 150 can include: selecting 155 an alert mode associated with a mobile station, the alert mode including at least one of: silent alert, vibrate and manual answer; detecting 160 the alert mode of the mobile station; and increasing 165 a length of a paging cycle in order to conserve power of an energy storage device associated with the mobile station, in response to the detected alert mode. This method can provide substantial energy savings in an energy storage device for a mobile station.

In a preferred embodiment, the selecting step 155 is made by a user selecting a desired alert mode. The detecting step 160, whereby the alert mode of the mobile station is detected, is accomplished in or communicated to the infrastructure 106, from the mobile station 102, 110 or 200. And, the increasing step 165, whereby the length of a paging cycle is adjusted in order to conserve energy of the power storage device associated with the mobile station 102, 110 or 200, in response to the detected alert mode, is typically triggered from the infrastructure 106 and communicated to the desired mobile station 102, 110 or 200. For example, if the nominal paging slot cycle interval is 320, 426 or 640 milliseconds, then a lengthened paging interval could be 1.2 seconds or 5.1 seconds, which could provide substantial energy savings. As should be understood by those skilled in the art, other examples and values are possible.

In one embodiment, the method 150 can further include returning the length of the paging cycle to an optimal length after at least one of: receipt of a certain threshold number of paging wake-ups and a period of time. Advantageously, this feature allows the mobile station to return to its optimal length or paging interval. For example, consider the case where the mobile is placed into a silent alert mode, which indicates the user is less interested in accepting incoming calls (indicia that it is unlikely that a user will answer). However, thirty minutes later, this silent alert mode may be less indicative of whether the user is willing to accept incoming calls, but the user has not gotten around to changing the alert mode. In this case, it is appropriate to use a longer paging interval immediately after the phone is placed into silent alert mode, as during that interval the user is more likely to not accept the incoming call (indicia that it is unlikely that a user will answer). However, thirty minutes later, the alert setting may still persist, but may be less indicative or neutral as to the likelihood that the user will actually answer the call.

In general, when a user is less likely to answer a call, it is less important that the phone immediately receive the incoming call, as the call will need to wait until approximately twenty seconds for the call to be redirected to voicemail or abandoned, and thus the difference between twenty and twenty three seconds is relatively minor (indicia that it is unlikely that a user will answer). In contrast, if the user is very likely to answer the call, then adjusting the paging interval may reduce the call establishment delay from 6 seconds, 3 seconds, or 2 seconds, to 0.5 seconds (indicia that it is likely that a user will answer).

In yet more detail, the length of the paging cycle can be returned to the optimum value, which involves returning the length to a value, the value being at least one of: an original length after expiration of a period of time, and an optimal value. This is motivated by the example detailed above.

In one embodiment, the step of increasing the paging cycle includes increasing a size of a slot cycle index of the paging cycle and subsequently returning the size of the slot cycle index to an optimal value, wherein returning the size of the slot cycle index to an optimal value includes returning the size to a value, the value being at least one of: an original size after expiration of a period of time and an optimal size. Advantageously, after the expiration of this interval, the paging interval should be returned to a more normal value, e.g. as would normally be used when there is a more neutral probability of the user immediately accepting the call.

In one embodiment, a programmable alert mode can be provided having a longer paging interval when there is indicia that it is unlikely that a user will answer and a shorter paging interval, when there is indicia that it is likely that a user will answer, for improved energy savings in a power storage device life when it is unlikely a user will answer (based on indicia), while also accommodating user demand for shorter paging intervals when a user is likely to answer (based on indicia), for example. Detailed herein are numerous examples of indicia where it is unlikely that a user will answer a mobile station and indicia where it is likely that a user will answer a mobile station (herein defined as "indicia that it is unlikely/likely that a user will answer"), Advantageously, this feature and structure as detailed herein, provides a useful compromise for energy conservation of the power storage device on one hand, while also accommodating a user's demand for a short paging interval on the other.

In connection with the alert mode, it can include at least one of: (i) when the mobile station's ring tone volume setting is configured to be relatively silent; (ii) when the mobile station's ring tone volume setting is configured to be relatively silent as compared to the surrounding environment where the mobile station is located; and (iii) when the mobile station is configured to ring or vibrate below a set threshold number of times before being redirected to voice mail or abandoning (indicia that it is unlikely that a user will answer). In general, the more times the phone will ring or vibrate before abandoning the call, the more likely the user will answer (indicia that it is likely that a user will answer). As a result, if more seconds of ringing or vibrating are configured then it is more likely the user will enter the call and as a result a shorter paging interval may be indicated (indicia that it is likely that a user will answer).

The mobile station can include a ring tone volume setting and a first higher ring tone volume threshold and a second lower ring tone volume threshold, configured such that: (i) in the event the ring tone volume is set below the second lower ring tone volume threshold, than the length of the paging cycle is increased (indicia that it is unlikely that a user will answer); (ii) in the event the ring tone volume is set between the thresholds, the length of the paging cycle is adjusted to an intermediate interval; and (iii) in the event the ring tone volume is set above both thresholds, the length of the paging cycle is adjusted to a shorter paging interval (indicia that it is likely that a user will answer). The above structure and features can provide further energy savings for the energy storage device. This is appropriate in the case of the following example. If the phone is in a location where there is loud background noise and the ring volume is relatively quiet, then it is relatively unlikely that the user will notice and/or answer the call. However, if the user is in a location where there is very little background noise, then having a low but not silent ring tone will not be as indicative of the probability that the user will notice/answer the call.

Similarly, the mobile station can include a ring mode, a vibrate mode and an automatic answer mode, such that: (i) in the event the mobile station is configured to ring, vibrate and has automatic answer mode set, the length of the paging cycle interval is decreased (indicia that it is likely that a user will answer); and (ii) in the event the mobile station is configured to ring below a set threshold number of times before being redirected to voice mail or abandoning and includes automatic answer mode, the length of the paging cycle interval is increased (indicia that it is unlikely that a user will answer), for additional energy savings.

Additionally, in the case where the phone is not only set to have a quiet ring tone, but is additionally set to have a manual answer mode, then a short call establishment is even less important. As a result, if more of the handset modes are set, as detailed herein, then the paging interval can be longer, even longer than it would be if it had a quiet ring tone, but was in automatic answer mode.

Figure 3:
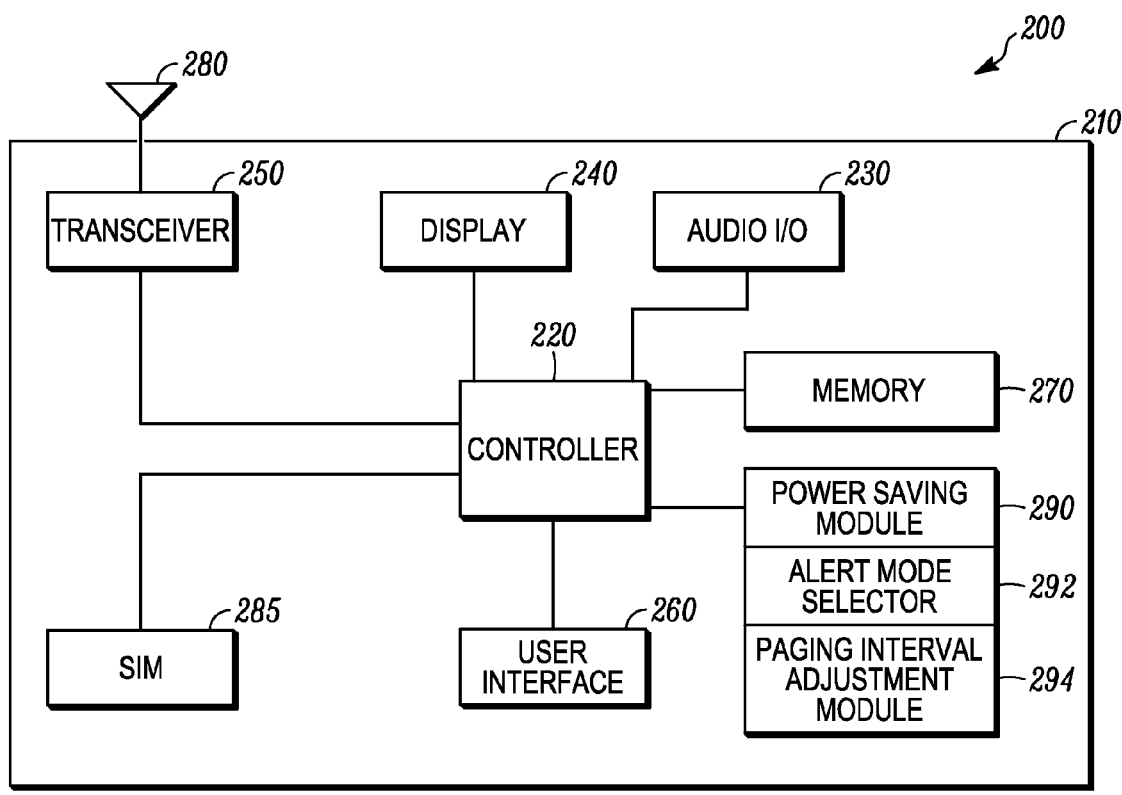
FIG. 3 is a block diagram of a device that provides for an improved battery life according to the present invention.

In a preferred embodiment, the alert mode can provide a longer paging interval when there is indicia that it is unlikely that a user will answer, and conversely, a shorter paging interval when there in indicia, that it is likely that a user will answer, which can help to conserve the energy in a power storage device, Referring now to FIG. 3 is an exemplary block diagram of a wireless communication device 200, such as the mobile station 102 or 110, according to one embodiment. The wireless communication device 200 can include a housing 210, a controller 220 coupled to the housing 210, audio input and output circuitry 230 coupled to the housing 210, a display 240 coupled to the housing 210, a transceiver 250 coupled to the housing 210, a user interface 260 coupled to the housing 210, a memory 270 coupled to the housing 210, an antenna 280 coupled to the housing 210 and the transceiver 250, and a removable subscriber module 285 coupled to the controller 220. The wireless communication device 200 further includes a power saving module 290, a selector 292, such as an alert mode selector and a paging interval adjustment module 294, which are coupled to the controller 220. In more detail, they can reside within the controller 220, can reside within the memory 270, can be autonomous modules, can be software, can be hardware, or can be in any other format useful for a module on a wireless communication device 200.

The display 240 can be a liquid crystal display (LCD), a light emitting diode (LED) display, a plasma display, or any other means for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch pad, a joystick, an additional display, or any other device useful for providing an interface between a user and an electronic device. The memory 270 may include a random access memory, a read only memory, an optical memory or any other memory that can be coupled to a wireless communication device.

In more detail, the wireless communication device 200 shown in FIG. 3, includes: a housing 210; a controller 220 coupled to the housing 210, the controller 220 configured to control the operations of the wireless communication device; memory 270 coupled to the controller 220; memory 270 coupled to the controller 220; a transceiver 250 coupled to the controller 220; and a power saving module 290 configured a power saving module configured to select an alert mode associated with a mobile station, the alert mode including at least one of: silent alert, vibrate and manual answer, and to increase a length of a paging cycle in order to conserve power of an energy storage device, in response to the selected alert mode.

Advantageously, the power saving module 290 and paging interval adjustment module 294 can allow the wireless communication device 200 to dynamically manage current drain of a power storage device, such as a battery, a fuel cell or electrochemical capacitor. This approach can provide a longer useful life of wireless communication devices before having to recharge one's power storage device.

In a preferred embodiment, the power saving module 290 can include a programmable alert mode. Advantageously, it can provide a longer paging interval when there is indicia that it is unlikely that a user will answer and a shorter paging interval, when there is indicia that it is likely that a user will want to answer, for improved energy savings in a power storage device life when it is unlikely a user will answer (based on indicia), while also accommodating user demand for shorter paging intervals when a user is likely to answer (based on indicia). Numerous examples of indicia where it is unlikely that a user will answer a mobile station and indicia where it is likely that a user will desire to answer a mobile station have been provided, Advantageously, this feature provides a useful compromise for energy conservation of the power storage device on one hand, while also accommodating a user's demand for a short paging interval when desired, on the other.

In one embodiment, the instant invention is incorporated into the communication infrastructure and in another it can be incorporated into a wireless communication device. Other placements are possible, such as including being in both.

Thus, approaches are described whereby the energy storage device of a mobile station is improved regardless of the operating environment or mode of the mobile station. Consequently, the mobile station can operate in a variety of operating conditions and utilize power-consuming services while maintaining and improving the lifetime an energy storage device of the mobile station. Because of these approaches, the user experience with the mobile station is significantly enhanced.

Those skilled in the art will recognize that a wide variety of modifications, alterations, and combinations can be made with respect to the above described embodiments without departing from the broad scope of the invention, and that such modifications, alterations, and combinations are to be viewed as being within the scope of the invention.

What is claimed is:

1. A method for lengthening the battery life of a mobile station, comprising:
   selecting an alert mode associated with a mobile station, the alert mode including at least one of: silent alert, vibrate and manual answer;
   detecting the alert mode of the mobile station;
   providing a programmable alert mode having an unlikely to answer mode including a longer paging interval when there is indicia present that it is unlikely that a user will answer and having a likely to answer mode including a shorter paging interval when there is indicia present that it is likely that a user will desire to answer; and
   increasing a length of a paging cycle in order to conserve power of an energy storage device associated with the mobile station, when in the unlikely to answer mode,
   wherein the mobile station includes a ring tone volume setting and a first higher ring tone volume threshold and a second lower ring tone volume threshold, configured such that: (i) in the event the ring tone volume is set below the second lower ring tone volume threshold, than the length of the paging cycle is increased; (ii) in the event the ring tone volume is set between the thresholds, the length of the paging cycle is adjusted to an intermediate interval; and (iii) in the event the ring tone volume is set above both thresholds, the length of the paging cycle is adjusted to a shorter paging interval.

2. The method of claim 1, further comprising returning the length of the paging cycle to an optimal length after at least one of: answering of a certain threshold number of calls, and a period of time and a number of page wake-up's.

3. The method of claim 2, wherein returning the length of the paging cycle to an optimum value comprises returning the length to a value, the value being at least one of: an original length after expiration of a period of time, and an optimal value that is related to RF operating conditions.

4. The method of claim 1, wherein the step of increasing the paging cycle includes increasing a size of a slot cycle index of the paging cycle.

5. The method of claim 4, further comprising subsequently returning the size of the slot cycle index to an optimal value.

6. The method of claim 5, wherein returning the size of the slot cycle index to an optimal value comprising returning the size to a value, the value being at least one of: an original size after expiration of a period of time and an optimal size that is related to measured RF operating conditions.

7. The method of claim 1, wherein the alert mode includes at least one of: (i) when the mobile station's ring tone volume setting is configured to be relatively silent; (ii) when the mobile station's ring tone volume setting is configured to be relatively silent as compared to the surrounding environment where the mobile station is located; and (iii) when the mobile station is configured to ring below a set threshold number of times before being abandoned or redirected to voice mail.

8. A method for lengthening the battery life of a mobile station, comprising:
   selecting an alert mode associated with a mobile station, the alert mode including at least one of: silent alert, vibrate and manual answer;
   detecting the alert mode of the mobile station; and
   increasing a length of a paging cycle in order to conserve power of an energy storage device associated with the mobile station, in response to the detected alert mode, wherein the mobile station includes a ring mode, a vibrate mode and an automatic answer mode, such that: (i) in the event the mobile station is configured to ring, vibrate and has automatic answer mode set, the length of the paging cycle interval is decreased; and (ii) in the event the mobile station is configured to ring or vibrate below a set threshold number of times before being redirected to voice mail or abandoning and includes automatic answer mode, the length of the paging cycle interval is increased.

9. A wireless communication device configured with an energy storage device, comprising:
   a housing;
   a controller coupled to the housing, the controller configured to control the operations of the wireless communication device;
   memory coupled to the controller;
   a transceiver coupled to the controller; and
   a power saving module configured to: select an alert mode associated with a mobile station, the alert mode including at least one of: silent alert, vibrate and manual answer; provide a programmable alert mode having an unlikely to answer mode including a longer paging interval when there is indicia present that it is unlikely that a user will answer and having a likely to answer mode including a shorter paging interval when there is indicia present that it is likely that a user will desire to answer; and to increase a length of a paging cycle in order to conserve power of an energy storage device, when in the unlikely to answer mode, wherein the power saving module includes a ring tone volume setting and a first higher ring tone volume threshold and a second lower ring tone volume threshold, configured such that: (i) in the event the ring tone volume is set below the second lower ring tone volume threshold, than the length of the paging cycle is increased; (ii) in the event the ring tone volume is set between the thresholds, the length of the paging cycle is adjusted to an intermediate interval; and (iii) in the event the ring tone volume is set above both thresholds, the length of the paging cycle is adjusted to a shorter paging interval.

10. The wireless communication device of claim 9, wherein the power saving module includes a selector and a paging interval adjustment module, the paging interval adjustment module being configured to return the length of the paging cycle to an optimal length after at least one of: receipt of a certain threshold number of wake-up calls and a period of time.

11. The wireless communication device of claim 9, wherein the power saving module includes a selector and a paging interval adjustment module, the paging interval adjustment module being configured to return the length of the paging cycle to an optimal length after at least one of: receipt of a certain threshold number of wake-up calls and a period of time, wherein an optimum value comprises returning the length to a value, the value being at least one of: an original length after expiration of a period of time, and an optimal value.

12. The wireless communication device of claim 9, wherein the power saving module includes a paging interval adjustment module, the paging interval adjustment module being configured to return the length of the paging cycle to an optimal length after at least one of: receipt of a certain threshold number of wake-up calls and a period of time, wherein the paging cycle includes increasing a size of a slot cycle index of the paging cycle.

13. The wireless communication device of claim 9, wherein the power saving module includes a paging interval adjustment module, the paging interval adjustment module being configured to return the length of the paging cycle to an optimal length after at least one of: receipt of a certain threshold number of wake-up calls and a period of time, wherein the paging cycle includes increasing a size of a slot cycle index of the paging cycle and subsequently returning the size of the slot cycle index to an optimal value.

14. The wireless communication device of claim 9, wherein the power saving module includes a paging interval adjustment module, the paging interval adjustment module being configured to return the length of the paging cycle to an optimal length after at least one of: receipt of a certain threshold number of wake-up calls and a period of time, wherein the paging cycle includes increasing a size of a slot cycle index of the paging cycle and subsequently returning the size of the slot cycle index to an optimal value, the optimal value comprising returning the size to a value, the value being at least one of: an original size after expiration of a period of time and an optimal size that is related to measured RF operating conditions.

15. The wireless communication device of claim 9, wherein the alert mode includes at least one of: (i) when the mobile station's ring tone volume setting is configured to be relatively silent; (ii) when the mobile station's ring tone volume setting is configured to be relatively silent as compared to the surrounding environment where the mobile station is located; and (iii) when the mobile station is configured to ring below a set threshold number of times before being redirected to voice mail or abandoning.

16. A wireless communication device configured with an energy storage device, comprising:
- a housing;
- a controller coupled to the housing, the controller configured to control the operations of the wireless communication device;
- memory coupled to the controller;
- a transceiver coupled to the controller; and
- a power saving module configured to select an alert mode associated with a mobile station, the alert mode including at least one of: silent alert, vibrate and manual answer, and to increase a length of a paging cycle in order to conserve power of an energy storage device, in response to the selected alert mode, wherein the power saving module includes a ring mode, a vibrate mode and an automatic answer mode, such that: (i) in the event the mobile station is configured to ring, vibrate and has automatic answer mode set, the length of the paging cycle interval is decreased; and (ii) in the event the mobile station is configured to ring below a set threshold number of times before being redirected to voice mail or abandoning and includes automatic answer mode, the length of the paging cycle interval is increased.

* * * * *